Patented Apr. 28, 1936

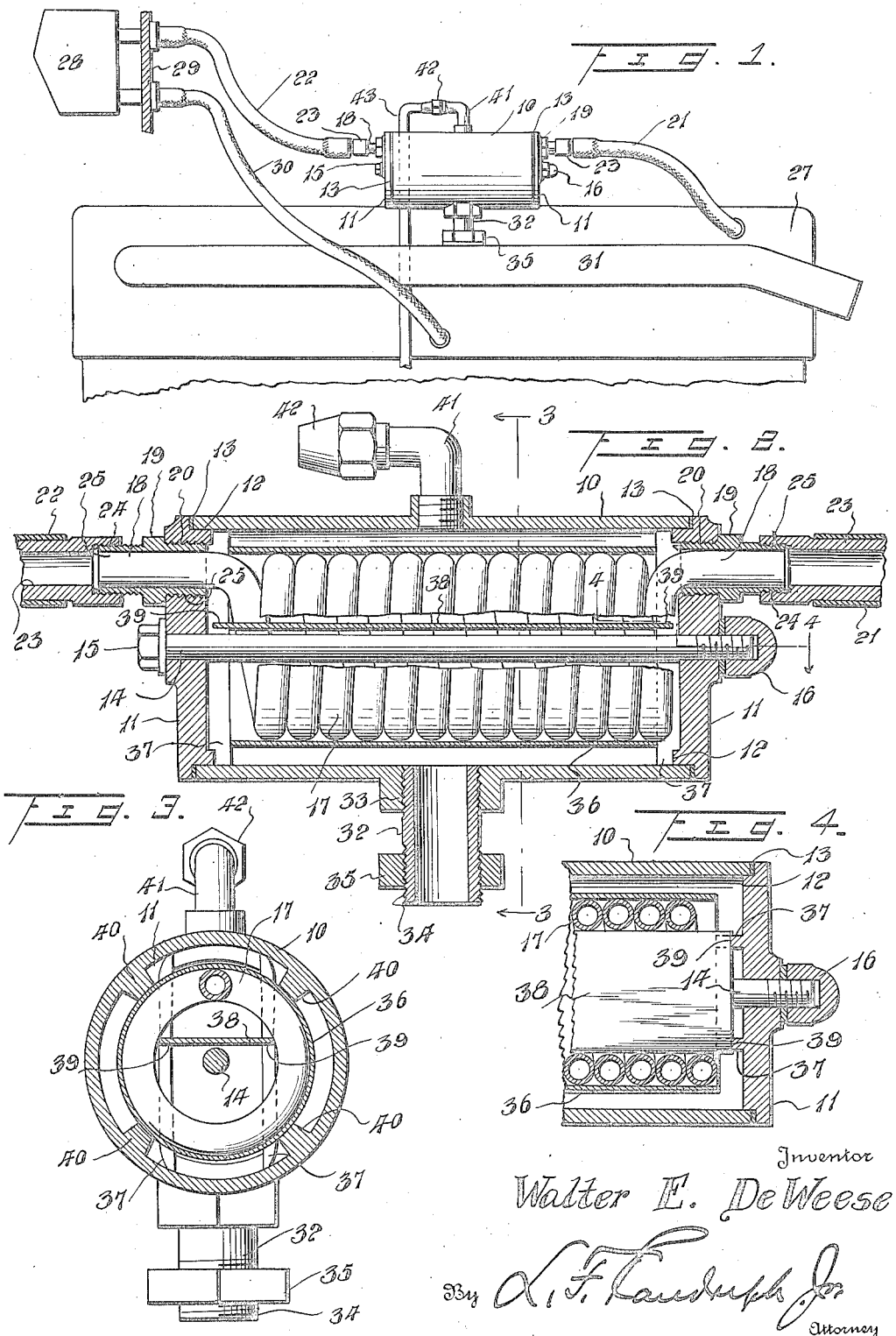

2,039,066

UNITED STATES PATENT OFFICE 2,039,066

WATER HEATER

Walter E. De Weese, Cleveland, Ohio

Application December 19, 1935, Serial No. 55,284

4 Claims. (Cl. 257—241)

This invention relates to heating means for a motor vehicle having an internal combustion or other engine provided with a water cooling system therefor and it generally aims to provide a novel water heater adapted for association with the exhaust manifold of such an engine. The device operates to heat the water to a higher temperature before the water reaches the radiator, in order to deliver maximum heat, almost instantaneously.

The more specific objects and advantages will become apparent from a consideration of the description following taken in connection with accompanying drawing illustrating an operative embodiment.

In said drawing:—

Figure 1 is a view showing my improvement attached to an internal combustion engine and associated automobile parts;

Figure 2 is a longitudinal sectional view, taken through the heater;

Figure 3 is a vertical sectional view taken on the plane of line 3—3 of Figure 3; and Figure 4 is a longitudinal sectional view taken on the plane of line 4—4 of Figure 2.

Referring specifically to the drawing, wherein like reference characters designate like or similar parts, the heater comprises a cylindrical body or casing 10 having removable end plates or closures 11 having a part 12 telescoped within the cylinder 10 and providing a shoulder or flange engaging the ends of such cylinder, with gasket 13 interposed. A bolt 14 extends centrally and removably through the plates 11 and cylinder 10, having a head 15 at one end and a nut 16 screw threaded to the other end. In this way the parts are removably clamped together.

A water conduit in the form of a coil 17, preferably made of copper, is disposed within the casing 10 and has inlet and outlet terminals 18 extending outwardly through openings in the plates 11. Nipples 19 surround the terminals 18 and have water-tight, screw threaded engagement at 20 in openings of the end plates 11. Conduits 21 and 22 are connected to the terminals 18, engaged with the ends of such terminals. The detachable connections are effected by means of clamping sleeves 23 secured on the conduit 21 and having screw threaded engagement at 24 with extensions 25 of nipples 19. Detachable and water-tight connections are thus effected.

Said pipe 21 is connected with the cooling water system of an internal combustion engine 27, as suggested in Figure 1 and the pipe 22 is connected with a radiator 28 located within an automobile and preferably fastened to the dashboard 29. The other connection from the radiator 28 to the water cooling system or jacket of the automobile engine 27 is effected through a pipe or conduit 30.

A heater is adapted to be primarily supported on and to be heated from the gases which are spent by the engine and which normally escape therefrom through an exhaust manifold 31. To this end, a nipple 32 is screw threaded at 33 into the lower side of the casing 10 and at 34 is screw threaded into an opening in the exhaust manifold 31, a lock nut 35 preferably engaging said screw thread 34, in addition.

A metallic cylinder 36 of less diameter than the interior of the casing 10 is disposed within such casing and about the coils 17, its opposite ends being engaged at opposite ends by internal ribs 37, integral with the plate 11, such ribs preferably being in parallelism and on opposite sides of the longitudinal axis.

Said cylinder 36 serves to effectively baffle the gases which enter the casing through nipple 32 from the exhaust manifold 31 and in order to further baffle such gases to cause them to take a tortuous path through the device to enable all effective heat to be extracted, a baffle plate 38 is disposed at approximately the center of the device, being effectively held in position as the ends thereof engage in slots 39 in said ribs 37. The casing of cylinder 36 is concentrically positioned since the casing 10 has a plurality of longitudinally and inwardly extending ribs 40 on the inner wall of casing 10 in engagement therewith.

The spent or exhaust gases from the casing 10 escape through an elbow 41 located at the top thereof which is connected in any suitable manner at 42 to a discharge pipe 43, leading to the lower part of the engine or automobile so as to discharge into the atmosphere at any preferred location.

In operation the heated gas enters the casing 10 through nipple 32 and is intercepted by the cylinder 36 and forced to the ends of the casing by the lowermost ribs 40, the gases encounter the extended ends of baffle 38 some of which pass between the ends of said baffle and the head plates 11 while a part of the gas passes between the side pairs of ribs 40 and the cylinder and a part under the baffle 38 into the core of the coil. This latter portion of the gas will pass between the coil and the edges of the plate upwardly and out at the ends of the coil, the final movement of the gas being inwardly towards the discharge at elbow 41. By this means it will be apparent that the heat from the gas will be effectively used to heat the coil 17 and superheat the water circulated therethrough.

It will be noted that the diameter of the outlet 41 is considerably less than the diameter of the inlet or nipple 32. As a result, the escaping gases will be muffled.

It will be clear that the plate 38 may be disposed at any desired location and that the baffling means may be generally arranged as desired.

Various changes may be resorted to provided they fall within the spirit and scope of the invention.

I claim as my invention:—

1. A mechanism of the class described having a casing, a coil therein for heating water, said coil having terminals, end plates connected to the casing and through which said terminals pass, connections for said terminals exteriorly of the casing, an inlet for a heating fluid, baffle means within such casing comprising a cylinder, and longitudinally extending ribs on said casing exteriorly engaging said cylinder.

2. A mechanism of the class described having a casing, a coil therein for heating water, said coil having terminals, end plates connected to the casing and through which said terminals pass, connections for said terminals exteriorly of the casing, an inlet for a heating fluid, baffle means within such casing comprising a cylinder, longitudinally extending ribs on said casing exteriorly engaging said cylinder, inwardly extending ribs on said end plates, and a baffle plate in the coil, said ribs having slots entered by the ends of said plates.

3. A mechanism of the class described having a casing, a coil therein for heating water, said coil having terminals, end plates connected to the casing and through which said terminals pass, connections for said terminals exteriorly of the casing, an inlet for a heating fluid, baffle means within such casing comprising a cylinder, longitudinally extending ribs on said casing exteriorly engaging said cylinder, inwardly extending ribs on said end plates, a baffle plate in the coil, said ribs having slots entered by the ends of said plates, and a bolt removably passing through the end plates.

4. A device of the class described having a casing, end plates for said casing, means detachably connecting the end plates to the casing, a coil for heating water disposed within the casing and having terminals extending outwardly through said end plates, inwardly extending ribs on said end plates provided with slots, and a baffle plate within the coil having engagement at its ends in said slots.

WALTER E. DE WEESE.